United States Patent [19]

Calhoun et al.

[11] Patent Number: 4,571,802
[45] Date of Patent: Feb. 25, 1986

[54] DOUBLE GRIP, RELATIVE MOTION TUBE PULLER

[76] Inventors: Gregory L. Calhoun, 457 Markle Rd., Apollo, Pa. 15613; Michael G. Brunner, 310 Marose Dr., Pittsburgh, Pa. 15235; Kevin L. Fields, 1 Windsor Rd., A-8 Alvin Ct., Pittsburgh, Pa. 15239

[21] Appl. No.: 605,351

[22] Filed: Apr. 30, 1984

[51] Int. Cl.$^4$ .................................... B23P 15/26
[52] U.S. Cl. ........................... 29/157.3 R; 29/157.4; 29/244
[58] Field of Search ............... 29/157.3 R, 157.3 C, 29/157.4, 244, 252, 426.4, 426.5, 426.1, 426.6

[56] References Cited

U.S. PATENT DOCUMENTS

| | | | |
|---|---|---|---|
| 4,000,556 | 1/1977 | Ciminero | 29/427 |
| 4,044,444 | 8/1977 | Harris | 29/727 |
| 4,077,102 | 3/1978 | Smith | 29/252 |
| 4,161,810 | 7/1979 | Beard et al. | 29/157.3 C |
| 4,180,903 | 1/1980 | Hannigan, Jr. | 29/727 |
| 4,213,239 | 7/1980 | Filer | 29/726 |
| 4,214,362 | 7/1980 | Beard | 29/726 |
| 4,280,274 | 7/1980 | Filer | 29/726 |
| 4,292,731 | 10/1981 | Filer | 29/726 |
| 4,355,450 | 10/1982 | Miller | 29/157.3 R |
| 4,368,571 | 1/1983 | Cooper, Jr. | 29/157.3 R |
| 4,369,569 | 1/1983 | Armstrong, Jr. | 29/726 |

FOREIGN PATENT DOCUMENTS

| | | | |
|---|---|---|---|
| 2756660 | 4/1979 | Fed. Rep. of Germany | 29/157.3 R |
| 2445198 | 8/1980 | France | 29/426 S |

Primary Examiner—Mark Rosenbaum
Assistant Examiner—John T. Burtch

[57] ABSTRACT

Both an apparatus and a process for pulling tubes from a tubesheet with two relatively movable gripping means are disclosed herein. The apparatus of the invention is a tube puller which has upper and lower gripping means for gripping the section of the tube surrounded by the tubesheet. The two gripping means are mechanically linked together by means of an extendable connecting assembly. This assembly includes an outer sleeve where the lower gripping means is located, and a middle sleeve where the upper gripping means is located which is slidable a predetermined distance within the outer sleeve. In the process of the invention, a tube puller as heretofore described is inserted into the mouth of a tube. The lower gripping means is then engaged to the mouth of the tube. The upper gripping means is then engaged in a section of the tube beyond the tube mouth with the extendable connecting assembly in a contracted position. A pulling means including a hydraulic ram then applies a tensile force onto the lower gripping means in order to pull on the mouth of the tube and to plastically contract the outer diameter of the tube in the vicinity of the tubesheet. After such contraction occurs, the connecting assembly between the two gripping means extends to its maximum length, and the pulling means applies a tensile force to both the upper and lower gripping means. Both of the gripping means then coact to withdraw the tube from the tubesheet. The invention preserves the metallurgical properties of the section of tube between the two grippers, which is important when the tubes are being sampled for corrosion degradation.

35 Claims, 12 Drawing Figures

DOUBLE GRIP, RELATIVE MOTION TUBE PULLER

BACKGROUND OF THE INVENTION

1. Field of the Invention

This invention relates to tube pullers for gripping and removing tubes from surrounding structures. It is particularly useful in removing heat exchanger tubes from tubesheets for subsequent metallurgical evaluation.

2. Description of the Prior Art

Tube grippers for gripping and pulling tubes out of tubesheets are known in the prior art. Typically, such tube grippers include an expandable jaw which may be inserted into the open mouth of the tube. Such expandable jaws usually include a plurality of gripping teeth on their outside surfaces which grip the inside walls of the tube when the jaw is expanded. Thereafter, a hydraulic ram or an equivalent pulling means pulls the tube from its tubesheet.

While such tube pullers are able to satisfactorily remove tubes from tubesheets in a variety of applications, they are seriously deficient in maintaining the metallurgical properties of the tubes they withdraw. This is a particularly serious drawback in nuclear steam generators, where samples of heat exchanger tubes must be periodically withdrawn through the tubesheet separating the primary water system from the secondary water system in order to determine whether or not the tubes in that particular steam generator are afflicted with corrosion degradation. The mouth of such a tube is typically expanded between two and four inches into the tubesheet; the frictional force between such a tube and its tubesheet is so great that a tensile force as high as 10 metric tons may be required to pull the sample tube out from the tubesheet. If the exterior walls of the tube have been degraded and weakened by corrosion, the tensile force required to pull an expanding jaw of a conventional tube puller may cause the tube to break, thereby making it difficult, if not impossible, to determine the exact degree to which the wall of the sample tube was weakened by corrosion degradation. Even if the tensile force which the expanding jaw applies to the mouth of the tube is not sufficient to actually break the tube, the application of such a large tensile force across the cross-section of the tube walls will, at the very least, distort the metallurgical properties of the tube by exacerbating any flaws the tube may have along its radius.

Clearly, a need exists for a tube puller which is capable of quickly and effectively gripping and pulling the tubes in tubesheets without distorting the metallurgical properties of these tubes in the regions sought to be examined.

SUMMARY OF THE INVENTION

Generally speaking, the invention is both an apparatus and process for gripping and pulling tubes without altering the metallurgical properties of the tubes. The invention accomplishes its purpose by means of a tube puller having upper and lower relatively movable grippers. While the invention is particularly adapted for removing sample tubes from tubesheets, it may more generally be used for removing any elongated structure which is frictionally engaged to a surrounding structure.

The apparatus of the invention comprises an upper and lower gripping means for gripping the ends of a longitudinal section of the tube, and a pulling means operatively connected to each of the gripping means. In operation, the apparatus is inserted into an open end of the tube, and the lower gripping means is engaged into the inner walls of the tube near its open end. Next, the upper gripping means is likewise engaged into the inner tube walls at a point further from the open end. The pulling means then applies a tensile force to the lower gripping means located near the open end of the tube. This tensile force has the effect of contracting the diameter of the tube a small amount in the longitudinal section of the tube located between the two grippers. When this plastic contraction in the diameter of the tube has been accomplished along the entire longitudinal section, the tensile force applied by the pulling means is shared by both the upper and lower gripping means, which has the effect of substantially isolating the longitudinal section between the grippers from the tensile force. The tube is then withdrawn from the tubesheet with no significant alterations in the metallurgical properties in the section between the tube grippers.

The apparatus of the invention may include an extendable connecting assembly for mechanically linking the upper and lower gripping means in tandem. The connecting assembly may be slidable between a contracted position and an extended position. More specifically, the connecting assembly may include an outer sleeve where the lower gripping means is located, and a middle sleeve telescopingly engaged to the outer sleeve where the upper gripping means is located. The middle sleeve may be freely slidable within the outer sleeve between the aforementioned contracted and extended positions. The distance between the contracted and extended positions is large enough so that the tube puller will contract the diameter of the tube being pulled enough to relieve a substantial amount of the frictional forces between the tube and the tubesheet, but small enough so that the metallurgical properties of the tube are not significantly altered.

The lower gripping means may include a self-tapping thread which may be threadedly engaged within the mouth of the tube adjacent the tubesheet. The upper gripping means may include an expandable collet having a plurality of barbed threads on its outside surface for releasably gripping the inside surface of the tube. The expandable collet may be formed from a high strength, resilient material such as 17-4 PH stainless steel, and may further include an expander member slidably movable within the mouth of the collet for expanding and contracting the diameter of the collet. The expander member may further be connected to an inner shaft which is concentrically disposed and slidably mounted within the middle and outer sleeves of the connector assembly. Finally, the inner shaft may be connected to an expander assembly which includes a nut having a left-handed thread.

In the process of the invention, a double-gripper tube puller as heretofore described may be inserted into the open mouth of a tube surrounded by a tubesheet. Next, the open mouth of the tube may be gripped by the self-tapping threads of the lower gripping means. Thereafter, the telescopically movable middle sleeve of the connecting assembly may be withdrawn into a contracted position by means of a gauge, for example. The upper gripping means may then be used to grip a portion of the interior wall of the tube which is located well inside the mouth portion of the tube. A hydraulic ram may then apply a tensile force onto the lower gripping means of the tube puller in order both to plastically contract the diameter of the tube a small amount between the lower and upper gripping means. This tensile force also has the effect of elongating the tube in this region a small amount, thereby bringing the middle sleeve of the connecting assembly from the aforementioned contracted position to a fully extended position. In the final step of the process, the tensile load applied to the tube puller by the hydraulic ram is shared by the upper and lower gripping means of the tube puller, and the tube is pulled out of the tubesheet.

DETAILED DESCRIPTION OF THE PREFERRED EMBODIMENT

Figure 1:
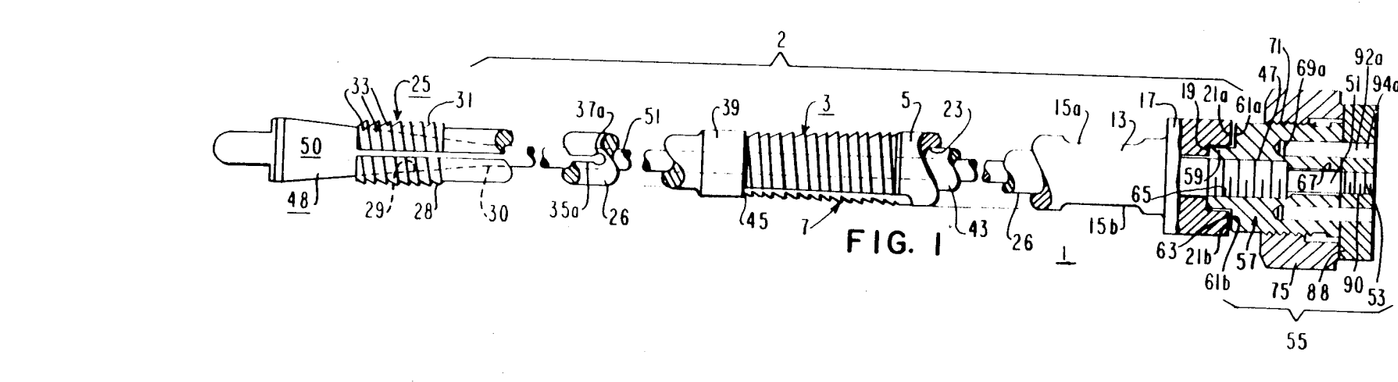
FIG. 1 is a partial cross-sectional side view of the tube puller of the invention.
Figure 1A:
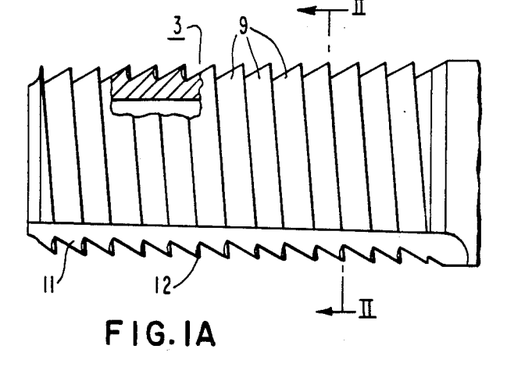
FIG. 1A is an enlarged view of the threaded portion of the lower gripper.
Figure 2:
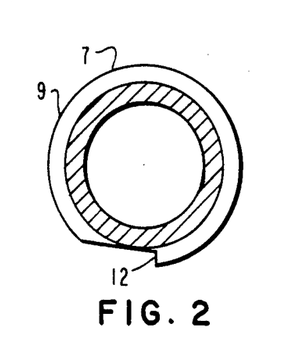
FIG. 2 is a cross-sectional view of line II—II through the threaded portion of the lower gripper of the tube puller illustrated in FIG. 1A.

With reference now to FIGS. 1, 1A and 2, wherein like numerals represent like parts, the tube puller 1 of the invention generally comprises a lower gripper 3 which may be screwed into the mouth of a tube to be removed, an upper gripper 25 having an expandable collet 28, and an expander base 57 for selectively expanding the collet 28. Generally speaking, the lower gripper 3 and the upper gripper 25 are linked together in tandem by means of an extendable connecting assembly 2. This connecting assembly 2 is formed from an outer sleeve 5 which carries the lower gripper 3, and a middle sleeve 26 which carries the upper gripper 25. Middle sleeve 26 is slidable for a short distance within the outer sleeve 5; consequently, the upper gripper 25 is extendable or contractable a short distance (illustrated by gaps 45 and 63) with respect to lower gripper 3. The longitudinal movement provided by the slidably mounted middle sleeve 26 in outer sleeve 5 is highly advantageous, because it allows the lower gripper 3 of the tube puller 1 to exert a tensile force on the mouth portion of the tube before both grippers 3 and 25 simultaneously grip and pull the tube. When the puller is used to remove a tube from the tubesheet in a steam generator, such a longitudinal action is particularly advantageous, since it allows the tensile force applied to the lower gripper 3 to plastically relax the two- to four-inch end portion of the tube which has been expanded into the tubesheet.

The lower gripper 3 generally includes outer sleeve 5 which extends between stop member 39 and base 17. The distal end of the outer sleeve 5 includes a threaded portion 7 having a plurality of barbed, self-tapping threads 9 which may best be seen in FIG. 1A. In the preferred embodiment, each of the threads 9 is a sharpened, buttress-type thread. For any given engagement pressure, the barbed profile of the threads 9 grip the inside walls of the tube better than threads having a conventional triangular profile, because the sharp edges of the barbed profile will allow the tips of the threads 9 to more easily penetrate the inner walls of the tube when the threaded portion 7 of the lower gripper 3 is screwed into the tube mouth. Such penetration, of course, serves to ensconce the teeth 9 more securely into the wall of the tube being pulled, thereby increasing the shear stress area in the tube. Consequently, the provision of a barbed thread profile, in lieu of a conventional triangular thread profile, allows the threaded portion 7 of the gripper 3 to apply a maximum amount of tensile force onto the inside surface of the tube being pulled for a minimum amount of screw-torque. The minimization of this screw-torque in turn insures that the engagement of the lower gripper 3 into the mouth of a selected tube will not significantly expand the tube within the tubesheet, and increase the frictional engagement between the tube and the tubesheet.

As may best be seen in FIG. 2, the threaded portion 7 of the lower gripper 3 includes a longitudinally oriented, tapping recess 11. This recess 11 provides the threads 9 with a cutting edge 12 to present to the inside wall of the tube being pulled. Additionally, the space which forms the tapping recess gives the metal shavings formed from the tapping process a place where they may accumulate without obstructing the tapping process. Preferably, threaded portion 7 is formed from 17-4 PH hardened stainless steel, so that the lower gripper 3 of the puller 1 may easily tap into the mouth of a nickle-iron-chromium tube of the type commonly used in nuclear steam generators.

Figure 4:
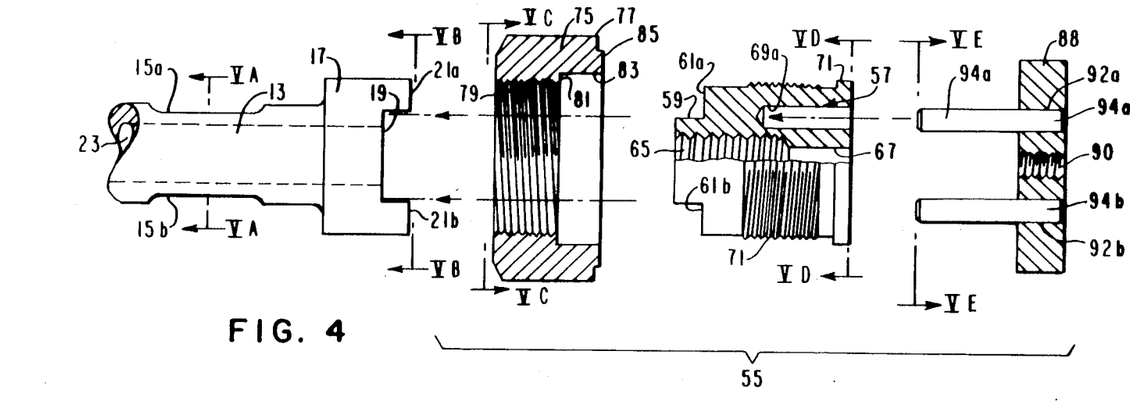
FIG. 4 is an exploded, partial cross-sectional side view of the expander base of the invention.
Figure 5A:
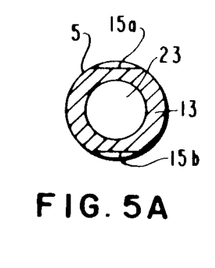
FIG. 5A is a cross-sectional view along line B—B in FIG. 4.
Figure 5B:
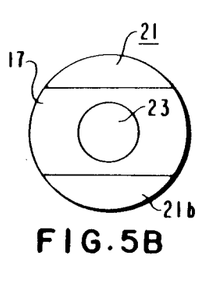
FIGS. 5B, 5C, 5D and 5E illustrate the rear faces of the base of the outer sleeve and the expander base, the front face of the expander nut, and the rear face of the expander disc, respectively.

With reference now to FIGS. 1, 4 and 5A, the proximal end of outer sleeve 5 includes a nut portion 13 formed from a pair of flat, wrench-receiving surfaces 15a, 15b. The nut portion 13 provides an area which may be firmly grasped by the jaws of an open-end wrench when the operator of the puller 1 desires to screw the lower gripper 3 into the mouth of the tube. The proximal end of outer sleeve 5 terminates in a base portion 17. The base portion 17 includes a female receiver 19 for receiving the male member 59 of the expander base 57. As is most easily seen in FIGS. 4 and 5B, female receiver 19 is formed by a pair of parallel, chord-shped lugs 21a, 21b. As is best seen in FIGS. 5A and 5B, outer sleeve 5 also includes a concentrically disposed bore 23 for slidably receiving the middle sleeve 26 of the upper gripper 25.

Figure 3:
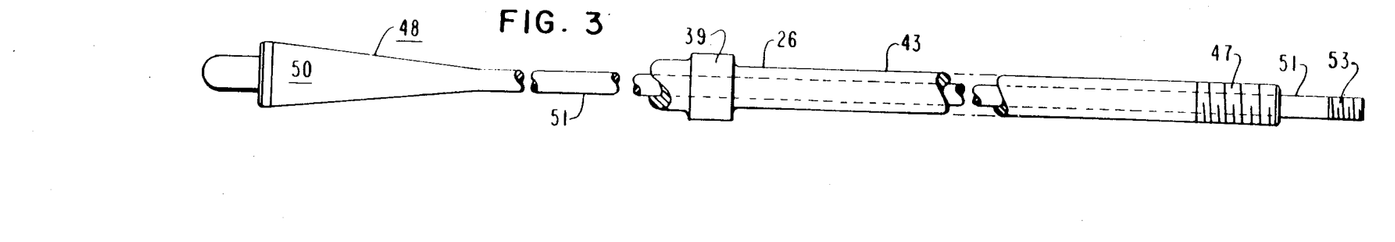
FIG. 3 is a side view of the expander member and lower part of the middle sleeve of the invention.

With reference now to FIGS. 1 and 3, the preferred embodiment of the tube gripper 1 further includes an upper gripper 25 disposed on the distal portion 27 of the middle sleeve 26. Upper gripper 25 includes an expandable collet 28 having a frusto-conical interior 29 which tapers into a cylindrical bore 30. The exterior 31 of the expandable collet 28 is threaded with a plurality of barbed, self-tapping threads 33 having much the same profile as the barbed threads of outer sleeve 5. Preferably, the expandable collet 28 includes five longitudinal slots 35a, 35b, 35c, 35d and 35e (not shown) equidistantly disposed around its circumference. These longitudinal slots allow expandable collet 28 to resiliently flex in response to longitudinal movement of expander member 48. Each of these longitudinal slots 35a, 35b, 35c, 35d and 35e preferably terminates in a stress-relieving keyhole 37a, 37b, 37c, 37d and 37e, respectively. These keyholes effectively dissipate the stress concentrated at the base of the aforementioned longitudinal slots when the frustro-conical body 50 of the expander member 48 is pulled backwards. In the preferred embodiment, the longitudinal sections of the collet 28 defined by the slots 35a, 35b, 35c, 35d and 35e each taper inwardly slightly in their unexpanded state, so that they will form a substantially cylindrical body when the frustro-conical body 50 of the expander member 48 is drawn into the interior 29 of the collet 28. In this way, each of the threads 33 of the upper gripper will engage the interior walls of the tube when the collet 28 is expanded.

Expander member 48 includes a frustro-conical body 50 at its distal end which tapers into a shaft 51. The shapes of the frustro-conical body 50 and the inner shaft 51 are complementary to the frustro-conical interior 29 and cylindrical bore 30, and the body 50 and inner shaft 51 are normally disposed in the interior 29 and bore 30 to a greater or lesser extent, depending upon whether the user wishes to expand collet 28. The inner shaft terminates on its proximal side in a threaded end 53 which is engageable within the threaded bore 90 of expander disc 88.

Centrally disposed in the middle sleeve 26 is stop member 39. As previously indicated, stop member 39 limits the amount of longitudinal, telescoping "play" between outer sleeve 3 and inner sleeve 26. More specifically, the slidable longitudinal movement between the outer sleeve 3 and the middle sleeve 26 is limited on the left side by stop member 39 near the middle of the puller 1, and on the right side by the male member 59 of the expander base 57. As is best seen in FIG. 3, the proximal end of the middle sleeve 26 terminates in a threaded portion 47. This threaded portion 47 is normally screwed into a female threaded bore 65 in the expander base 57.

With reference now to FIGS. 1, 4, 5C, 5D and 5E, the expander assembly 55 of the invention 1 includes a expander base 57, a expander nut 75, and a expander disc 88 having a pair of dowel pins 94a, 94b slidably movable within complementary bores 69a, 69b in the base 57.

Figure 5C:
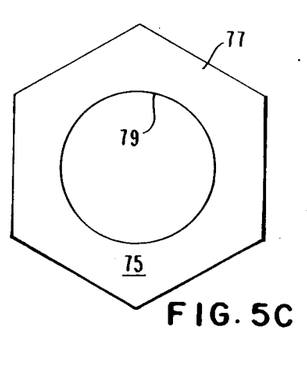

The front portion of expander base 57 includes the previously discussed male member 59 which is receivable within female receiver 19 at the base 17 of outer sleeve 3. Preferably, the length of male member 59 is slightly longer than the length of the chordal-shaped lugs 29a, 29b which form the female receiver 19, so that the front of the male member 59 will always engage the rear face of the female receiver 19 when the upper gripper 25 is in its most extended position. Such dimensioning controls stoppage of the telescopic movement between the outer sleeve 5 and the middle sleeve 26 by insuring that the front face of the male member 59 will always first seat against the rear face of the female receiver 19, before the lugs 21a, 21b of the female receiver 19 contact the shoulders 61a, 61b of the male member 59. In its interior, expander base 57 includes a centrally disposed threaded bore which extends about two-thirds down its longitudinal axis from male member 59. As is best seen in FIG. 1, this female threaded bore 65 receives the threaded portion 47 of the middle sleeve 26 and thereby secures it within the expander assembly 55. Throughout the last third of its longitudinal axis, expander base 57 includes a relatively narrow smooth bore 67 which opens into the female threaded bore 65 as shown. Smooth bore 67 receives the proximal end 52 of the inner shaft 51 of expander member 48, as illustrated in FIG. 1. As is best seen in FIGS. 4 and 5C, the smooth, centrally disposed bore 67 of expander base 57 is flanked by two other smooth bores 69a, 69b. As previously indicated, bores 69a, 69b slidably receive dowel pins 94a, 94b of disc 88. On its outside, expander base 57 includes a left-handed thread 79 for receiving the threads of nut 75, as well as an annular stop member 71 for limiting the degree to which nut 75 may be withdrawn along the longitudinal axis of expander base 57. Specifically, when expander nut 75 is screwed backwards to its outermost limit, annular shoulder 81 of the nut 75 will engage the annular stop 71 and prevent the nut 75 from being screwed back any further. The stopping function of annular stop 71 is most clearly seen with reference in FIG. 1.

Figure 5D:
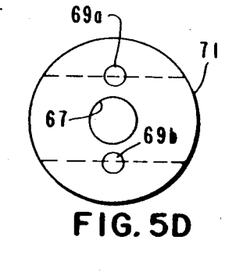

With specific reference now to FIGS. 4 and 5D, expander nut 75 includes a hexagonal exterior 77 which may be easily grasped and turned by the jaws of a conventional wrench. The distal interior portion of nut 75 includes a left-handed threaded 79 which is complementary to the left-handed thread 71 of the expander base 57. The proximal portion of the inside of nut 75 includes an annular recess 83 which, as will presently be seen in more detail, defines the extent to which the frustroconical body 50 of the expander member 58 may be pulled through the mouth of expandable collet 28 via inner shaft 51. The annular recess 83 of nut 75 is separated from the interior left-handed thread 78 via annular shoulder 81, which coacts with annular stop 71 of expander base 57 to stop the rearward motion of the nut 75 in the manner previously described. The provision of a left-handed thread in the expander base 57 and nut 75 serves two functions. First, it insures that the torque applied to the tube puller 2 when the expander member 48 of the upper gripper 25 is withdrawn into the interior 29 of the collet 28 will serve to tighten, rather than loosen, the threads 9 of the lower gripper from the inside of the tube. Secondly, the inventors have noticed a tendency on the part of persons operating such tube pullers to turn the expansion nuts of the upper gripper in a clockwise direction to secure the upper gripper into the tube, as though they were tightening a screw. Hence, the provision of a left-handed thread on nut 75 insures that this tendency toward a clockwise rotation of the nut will in fact expand the collet 28 inside the tube, rather than loosen it, as would a right-handed thread.

Figure 5E:
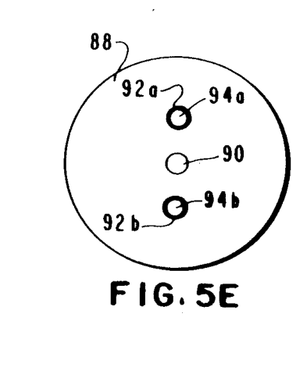

With reference now to FIGS. 1, 4 and 5E, the last major component of the puller assembly is the expander disc 88. As previously indicated, the disc 88 includes a central, threaded bore 90 which receives the threaded end of inner shaft 51 of expander member 48. Flanking threaded bore 90 is a pair of dowel pins 94a, 94b which are securely mounted within complementary bores 92a, 92b. The dowel pins 94a, 94b isolate the screw joint between the threaded end of inner shaft 51 and threaded bore 90 of disc 88 from the torsional forces which the annular surface 85 of the nut 75 exerts onto the disc 88 when the nut 75 is twisted.

Figure 6:
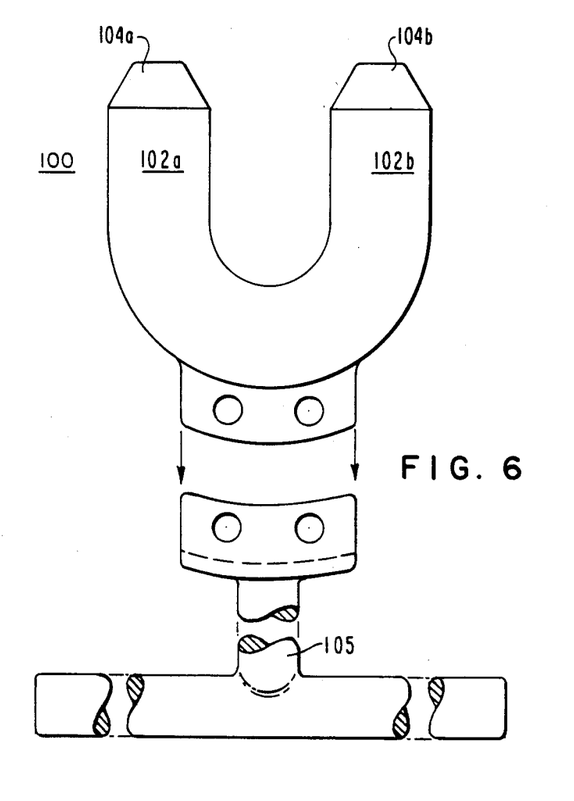
FIG. 6 is a front view of the spacer gauge of the invention.

With reference now to FIG. 6, the final component of the tube puller 1 of the invention is the spacer tool 100. Spacer tool 100 is generally Y-shaped, having two arms 102a, 102b extending from a single leg 105. In the preferred embodiment, the arms 102a, 102b and leg 105 of the tool 100 are approximately 0.05 in. thick. Additionally, the tip ends of the arms 104a, 104b are preferably tapered so that the spacer tool may be easily slid in the gap 63 between the lugs 21a, 21b of the base 17 of the outer sleeve 3, and the shoulders 61a, 61b flanking the male member 59 of the puller base 57. When the Y-shaped spacer tool 100 is slid into the tube puller 1 in this fashion, the middle sleeve 26 carrying the upper gripper 25 is in its most longitudinally contracted position with respect to lower gripper 3.

A conventional hydraulic ram 117 (schematically represented) is used to exert a tensile force onto the lower gripper 3 of the tool 1. Such rams are capable of exerting a tensile force of over 10 metric tons onto the tool 1, which is sometimes necessary to pull a heat exchanger tube out of a tubesheet.

Figure 7:
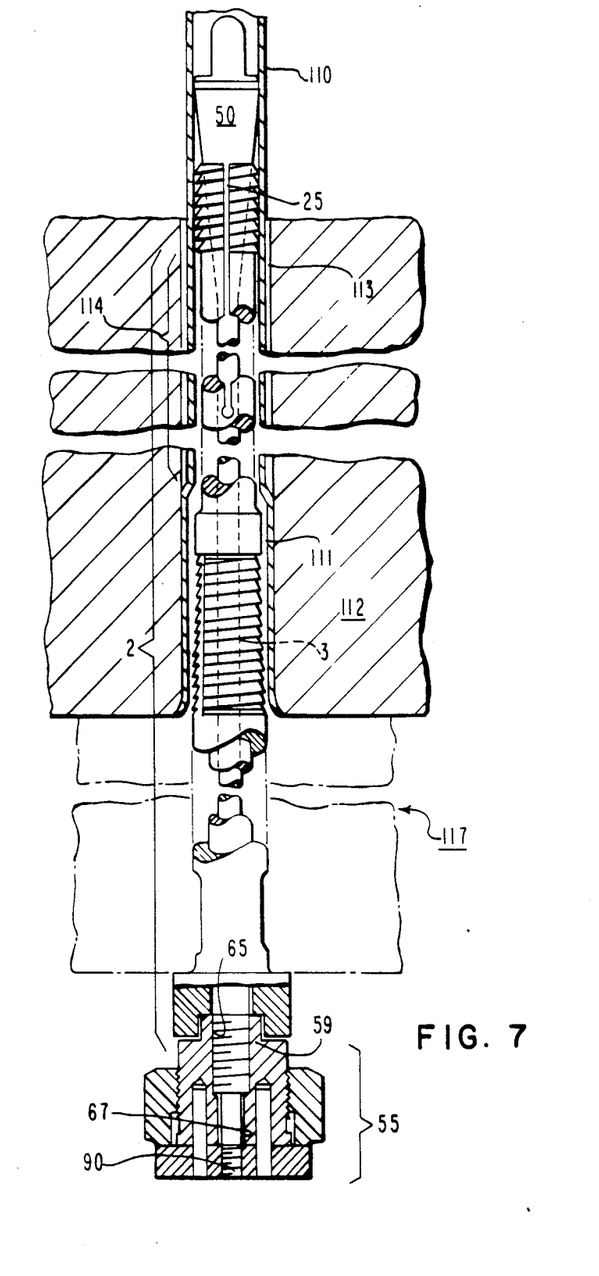
FIG. 7 is a side, partial cross-sectional view of the gripper inside a heat exchanger tube.

FIG. 7 illustrates the preferred process of the invention. Here, a tube puller 1 as heretofore described is inserted into the open end of a tube 110 frictionally engaged within a tubesheet 112. In this example, the tube 110 and tubesheet 112 are of the type typically used in a nuclear steam generator. In such generators, the heat exanger tubes 110 are usually expanded around their open ends to form a frictional joint 111 between the tube 110 and the tubesheet 112. Additionally, there is usually a small annular gap 13 between the tube 110 and the tubesheet 112 above the joint 111. Boron salts and other corrosive materials sometimes accumulate in this annular region 113, and cause the walls to corrosively degrade in the longitudinal portion 114 of the tube 110 between the top of the joint 111, and the top surface of the tubesheet 112. Because the tube 110 may be weakened in this region 114, it is important that this region be isolated as much as possible from large tensile forces which can break the tube 110, or, at the very least, negatively distort its metallurgical properties so much in the region 114 that a representative sample is not obtained. Exactly how the gipper 1 of the invention accomplishes this desired result will become evident from the following description of the process of the invention.

After the gripper 1 is inserted into the tube 110, the lower gripper 3 is then engaged within the mouth of the tube by screwing the threaded portion 7 into the inner walls of the tube. In the case of a tube in a nuclear steam generator that has been expanded for a distance of two to four inches around the mouth of the tube in order to secure the tube into the tubesheet, the threaded portion 7 of the lower gripper will preferably overlie this expanded region. The lower gripper 3 is screwed into the tube mouth by grasping nut protion 13 of the outer sleeve 5 with the jaws of an open-end torque wrench and twisting the entire puller 1 in a clockwise direction. This twisting motion continues until the lower gripper 3 is twisted to a desired torque. Such a twisting motion screws the barbed, self-tapping threads 9 of the outer sleeve 5 securely into the inner walls of the tube 110.

Next, in order to insure that the lower gripper 3 will provide tension across the joint 111 of the tube before the upper gripper 25 comes into play, the blades 104a, 104b of the Y-shaped spacer tool are inserted into the gap 63 between the base 17 of the outer sleeve 3 and the shoulders 61a, 61b of the puller base 57. The insertion of the spacer tool 100 telescopically extends the outer sleeve 3 over the middle sleeve 26 to its most extreme, extended position, which abuts the distal end of sleeve 3 against the stopping member 39, thereby completely eliminating any gap 45 between the two. Such positioning between the outer sleeve 3 and the middle sleeve 26 brings the upper gripper 25 to its closest position to the lower gripper 3.

After the grippers are brought into their closest position with respect to one another, the upper gripper 25 is engaged to the inner walls of the tube 110 by rotating nut 75 in a clockwise direction. Because nut 75 engages expander base 57 through left-handed threaded 79, nut 75 moves backwards along the longitudinal axis of the tool 1, thereby drawing the inner shaft 51 of the expander member 48 along with it. Consequently, the barbed threads 33 on the fingers of the expandable collet 28 are pushed outwardly by the frustro-conical body 50 of the expander member 48, which causes them to grippingly engage the interior walls of the tube 110 in the position shown. Preferably, the rotation of nut 75 is accomplished by means of a torque wrench, and the nut 75 is twisted until a desired torque is reached.

In the final steps of the preferred process of the invention, the Y-shaped spacer tool 100 is removed, and the previously-mentioned hydraulic ram 117 of conventional manufacture is detachably mounted around the base 17 of the outer sleeve 5. The cylinders of the hydraulic ram 117 are then actuated, which causes the lower gripper 3 of the tube puller 1 to immediately exert a tensile force on the open end of the tube 110 being pulled. However, because of the small amount of "play" between the outer sleeve 5 holding the lower gripper 3, and the middle sleeve 26 holding the upper gripper 25, no tensile force is applied onto the tube through the upper gripper 25 until the tube has been slightly longitudinally stretched the length of the gap 63 left in the puller assembly by the Y-shaped spacer tool 100. This tensile force causes a very small but significant plastic deformation in the tube which has the effect of slightly decreasing its radial cross-section of the tube 110 in the region of the joint 111. This plastic deformation relaxes the expansion joint 111 between the tube 110 and tubesheet 112. This relaxation of the expansion joint 111, and decrease in the radial cross-section of the tube 110 in turn reduces the amount of frictional engagement between it and the surrounding tubesheet 112. After this very slight radial contraction of the tube has taken place, the middle sleeve 26 is extended to its most extreme position within outer sleeve 5, which in turn causes the connecting assembly 2 of the tube puller to effectively transfer tensile force simultaneously between the hydraulic ram and both the lower and upper grippers 3 and 25. Both the upper gripper 25 and lower gripper 3 then share the tensile load.

It should be noted that the sharing of the tensile load by the upper and lower grippers 25 and 3 essentially isolates the region 114 of the tube 110 between the two grippers 3 and 25 from significant amounts of tensile force. Viewed another way, the upper gripper 25 applies a compressive force on the longitudinal region 114 of the tube 110 which cancels out the tensile force applied to this region by the lower gripper 3. From either perspective, the invention produces the desired effect of preserving the metallurgical properties of the tube in region 114.

What is claimed is:

1. An apparatus for removing an elongated, elastically deformable conduit from a structure which frictionally engages a longitudinal portion of the outside walls of said conduit, comprising:
    (a) independently actuable upper and lower gripping means for gripping the ends of a longitudinal section of said conduit which corresponds at least in part to said longitudinal portion of said conduit, said upper gripping means being movable between a minimum and a maximum distance from said lower gripping means, and (b) a pulling means operatively connected to said upper and lower gripping means for applying a tensile force first on said lower gripping means while said lower gripping means and said upper gripping means are actuated and are substantially at their minimum distance from each other in order to plastically contract the cross-sectional area of said conduit in said longitudinal section, and then, after the cross-sectional area of said conduit has been plastically contracted and said upper gripping means have been extended substantially to their maximum distance from said lower gripping means by longitudinal stretching of said longitudinal section of said conduit, for applying said tensile force to said conduit through said upper gripping means, relieving the tension in said longitudinal section of said conduit imparted by said tensile force, the simultaneous application of said tensile force through said upper and lower gripping means acting to pull said conduit through said structure while said upper and lower gripping means are maintained substantially at their maximum distance from each other, said upper and lower gripping means acting together to substantially isolate said longitudinal section from said tensile force.

2. The apparatus of claim 1, wherein said conduit is a tube.

3. The apparatus of claim 2, wherein said structure is a tubesheet.

4. The apparatus of claim 2, wherein each of said upper and lower gripping means releasably grips the ends of said longitudinal section of said tube.

5. The apparatus of claim 2, wherein said pulling means includes an elongated extendable connecting assembly for mechanically linking said upper and lower gripping means in tandem.

6. The apparatus of claim 5, wherein said pulling means further includes a hydraulic ram detachably connectable to said lower gripping means for applying said tensile force to said upper gripping means.

7. The apparatus of claim 6, wherein said extendable member is capable of extending a sufficient distance along its longitudinal axis when said pulling means applies a tensile force to said lower gripping means so that said cross-sectional area of said tube is elastically contracted before both said upper and said lower gripping means simultaneously apply a tensile force on said tube.

8. An apparatus for removing tubes from a tubesheet, comprising:

(a) independently actuable upper and lower gripping means movable with respect to each other for releasably gripping the ends of a longitudinal section of said tube at least in part surrounded by and in frictional engagement with said tubesheet, and (b) a pulling means operatively connected to said upper and lower gripping means for applying a tensile force first on said lower gripping means while said lower and said upper gripping means are engaging said tube and said upper gripping means is disengaged from said pulling means in order to plastically contract the outside diameter of said tube along said longitudinal section, and then, after said upper gripping means is engaged to said pulling means, for applying said tensile force on said upper and said lower gripping means simultaneously, said upper and lower gripping means acting to substantially isolate said longitudinal section from said tensile force while said tensile force is being simultaneously applied through said upper and lower gripping means, said tensile force acting to pull said tube from said tubesheet.

9. The apparatus of claim 8, wherein said upper and lower gripping means releasably grip the ends of a longitudinal section of said tube which substantially coincides with the longitudinal portion of said tube engaged within said tubesheet.

10. The apparatus of claim 9, wherein said tube includes a mouth portion, and wherein said lower gripping means releasably grips said mouth portion.

11. The apparatus of claim 10, wherein said lower gripping means includes a self-tapping thread engageable within the interior surface of the mouth of said tube.

12. The apparatus of claim 8, wherein said pulling means includes an extendable connecting assembly mechanically linking together said upper and lower gripping means.

13. The apparatus of claim 12, wherein said extendable connecting assembly includes an outer sleeve where said lower gripping means is located, and a middle sleeve freely movable for a predetermined distance relative to said outer sleeve where said upper gripping means is located.

14. The apparatus of claim 13, wherein said middle sleeve includes a portion which is freely slidable within said outer sleeve.

15. The apparatus of claim 14, wherein said slidable portion of said middle sleeve is concentrically mounted within said outer sleeve.

16. The apparatus of claim 13, wherein said middle sleeve is sufficiently extendable along its longitudinal axis to cause a plastic contraction of the outer diameter of the longitudinal section of said tube when said middle sleeve is completely contracted, said upper and lower gripping means are engaged to the ends of said longitudinal section, and said pulling means applies said tensile force onto said lower gripping means.

17. The apparatus of claim 8, wherein at least one of said gripping means includes at least one barbed thread.

18. The apparatus of claim 8, wherein said lower gripping means includes a plurality of barbed threads for releasably gripping the inside surface of said tube.

19. The apparatus of claim 8, wherein said upper gripping means includes an expandable collet having a plurality of barbed threads on its outside surface for releasably gripping the inside surface of said tube, and an expander member for expanding said collet.

20. The apparatus of claim 19, wherein said collet is elongated and resiliently expandable, and wherein said expander member is disposed within the collet and movable along the longitudinal axis of the collet.

21. The apparatus of claim 20, wherein said expander member is connected to an inner shaft which includes a threaded portion, and wherein said apparatus further includes an expander assembly having a disc which is threadedly engaged to said threaded portion of said shaft.

22. The apparatus of claim 21, wherein said expander assembly includes a left-handed nut operatively engaged against said disc for pulling said expander member along the longitudinal axis of said collet, and expanding said collet.

23. The apparatus of claim 8, wherein said pulling means includes an extendable connecting assembly having an outer sleeve where said lower gripping means is located, and a middle sleeve telescopically engaged to said outer sleeve where said upper gripping means is located.

24. The apparatus of claim 23, wherein said upper gripping means includes a resiliently expandable, threaded collet having barbed threads on its outside surface.

25. The apparatus of claim 23, wherein said collet is elongated, and said upper gripping means further includes an expander member longitudinally movable within said collet.

26. The apparatus of claim 25, wherein said expander member is connected to an inner shaft slidably movable within said middle and outer sleeves.

27. The apparatus of claim 26, wherein said apparatus includes an expander assembly having a nut for moving said shaft and hence said expander member within said collet.

28. The apparatus of claim 27, wherein said nut includes a left-handed thread.

29. An apparatus for removing tubes from a tubesheet, comprising:
 (a) a lower gripping means for gripping an open end of a tube in a tubesheet, including a plurality of barbed threads for engaging the inner walls of said tube in the vicinity of said open end;
 (b) an upper gripping means for gripping said tube at a point further within said tube than said lower gripping means, including an expandable collet having barbed threads on its exterior surface and a tapered recess in its interior for receiving a frustroconical expander member;
 (c) an extendable connecting assembly for linking said lower and upper gripping means together in tandem, including:
  (i) an outer sleeve, wherein said lower gripping means is positioned, and
  (ii) a middle sleeve telescopically slidable within said outer sleeve between a contracted position and an extended position; and
 (d) an expander assembly for pulling said frustroconical expander member within said tapered recess in said expandable collet, including a base member having a left-handed thread on its exterior surface, and a nut threadedly engaged to said base member and operatively engaged to an inner shaft connected to said expander member.

30. A process for removing a conduit from a structure which frictionally engages a longitudinal portion of the outside walls of said conduit, comprising the steps of:
 (a) gripping first and second points along the longitudinal axis of said conduit with a first and second gripping means respectively, wherein said first and second points define a longitudinal section of said conduit which corresponds at least in part with said longitudinal portion of said conduit;
 (b) applying a first tensile force to said first gripped point through said first gripping means while said second gripping means is free to move with respect to said first gripping means in order to plastically deform said conduit, reducing the radial cross-section of said conduit, thereby relieving at least some of the frictional force between said structure and said longitudinal portion of said conduit;
 (c) applying a second tensile force to said second gripped point through said second gripping means which is substantially equal to said first tensile force after said conduit is plastically deformed by said first tensile force, said second tensile force cooperating with said first tensile force and said first and second gripping means to substantially relax the tension in said longitudinal section imparted by said first tensile force; and
 (d) removing said conduit from said structure while said longitudinal section is substantially isolated between said first and second gripping means from said first and second tensile forces.

31. The process of claim 30, wherein said longitudinal section of said conduit defined by said first and second points includes substantially all of said longitudinal portion of said conduit.

32. The process of claim 30, wherein said conduit is a tube, and said surrounding structure is a tubesheet.

33. The process of claim 30, wherein said second point is gripped by means of a plurality of barbed threads.

34. The process of claim 30, wherein said first point is gripped by a screw thread.

35. A process for removing a tube from a tubesheet by means of a tube puller including upper and lower gripping means mechanically linked in tandem by means of an extendable connecting assembly which is freely movable between a contracted position and an extended position, comprising the steps of:
 (a) inserting said tube puller through an open end of said tube in the vicinity of said tubesheet;
 (b) gripping the open end of said tube by said lower gripping means;
 (c) withdrawing said extendable member into a contracted position;
 (d) gripping a portion of the interior wall of said tube by means of said upper gripping means while said extendable connecting assembly is at said contracted position;
 (e) applying a first tensile force on only the lower gripping means of said tube puller in order both to plastically deform the longitudinal portion of the tube between said upper and lower gripping means in radial cross-section, and to bring said extendable connecting assembly from said contracted to said extended position by longitudinally stretching said longitudinal portion of the tube; and
 (f) applying said tensile force on the upper gripping means of said tube puller through said extended connecting assembly in tandem with said lower gripping means, said simultaneous application of said tensile force on said upper and lower gripping means acting to relax the tension in the longitudinal section of the tube between said upper and lower gripping means, enabling the tube to be pulled from said tubesheet without further deformation of said longitudinal section.

* * * * *